(12) United States Patent
Belton et al.

(10) Patent No.: US 7,620,578 B1
(45) Date of Patent: Nov. 17, 2009

(54) VOLATILITY DERIVATIVE FINANCIAL PRODUCT

(75) Inventors: Terry Belton, Wilmette, IL (US); Srini Ramaswamy, West Windsor, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 274 days.

(21) Appl. No.: 11/414,426

(22) Filed: May 1, 2006

(51) Int. Cl.
*G06Q 40/00* (2006.01)

(52) U.S. Cl. .......................................... 705/35; 705/36

(58) Field of Classification Search .............. 705/35–36
See application file for complete search history.

(56) References Cited

U.S. PATENT DOCUMENTS

| | | |
|---|---|---|
| 4,169,285 A | 9/1979 | Walker |
| 4,648,038 A | 3/1987 | Roberts et al. |
| 4,739,478 A | 4/1988 | Roberts et al. |
| 4,742,457 A | 5/1988 | Leon et al. |
| 4,752,877 A | 6/1988 | Roberts et al. |
| 4,933,842 A | 6/1990 | Durbinet et al. |
| 5,121,469 A | 6/1992 | Richards et al. |
| 5,222,019 A | 6/1993 | Yoshino et al. |
| 5,257,369 A | 10/1993 | Skeen et al. |
| 5,270,922 A | 12/1993 | Higgins |
| 5,297,032 A | 3/1994 | Trojan et al. |
| 5,305,200 A | 4/1994 | Hartheimer et al. |

(Continued)

FOREIGN PATENT DOCUMENTS

WO    WO 98/43170    10/1998

(Continued)

OTHER PUBLICATIONS

Manco et al., A Framework For Adaptive Mail Classification, 14th IEEE Conference on Tools with Artificial Intelligence (ICTAI'02), Nov. 4, 2002, p. 387.

(Continued)

*Primary Examiner*—Thu Thao Havan
(74) *Attorney, Agent, or Firm*—Hunton & Williams LLP; Jeffrey Scott Leaning

(57) ABSTRACT

A system for and method of tracking and investing volatility is disclosed. The system and method may be used to commodify the volatility of any set of assets. The system and method may include a financial instrument that allows an investor to take a view on volatility.

20 Claims, 2 Drawing Sheets

U.S. PATENT DOCUMENTS

| | | |
|---|---|---|
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,563,783 A | 10/1996 | Stolfo et al. |
| 5,592,379 A | 1/1997 | Finfrock et al. |
| 5,649,186 A | 7/1997 | Ferguson |
| 5,675,746 A | 10/1997 | Marshall |
| 5,706,502 A | 1/1998 | Foley et al. |
| 5,710,889 A | 1/1998 | Clark et al. |
| 5,724,593 A | 3/1998 | Hargrave, III et al. |
| 5,778,157 A | 7/1998 | Oatman et al. |
| 5,787,402 A | 7/1998 | Potter et al. |
| 5,806,047 A | 9/1998 | Hackel et al. |
| 5,806,048 A | 9/1998 | Kiron et al. |
| 5,819,273 A | 10/1998 | Vora et al. |
| 5,832,461 A | 11/1998 | Leon et al. |
| 5,845,266 A | 12/1998 | Lupien et al. |
| 5,864,827 A | 1/1999 | Wilson |
| 5,890,140 A | 3/1999 | Clark et al. |
| 5,913,214 A | 6/1999 | Madnick et al. |
| 5,918,218 A | 6/1999 | Harris et al. |
| 5,922,044 A | 7/1999 | Banthia |
| 5,940,810 A | 8/1999 | Traub et al. |
| 5,944,784 A | 8/1999 | Simonoff et al. |
| 5,946,667 A | 8/1999 | Tull, Jr. et al. |
| 5,950,176 A | 9/1999 | Keiser et al. |
| 5,966,531 A | 10/1999 | Skeen et al. |
| 5,966,672 A | 10/1999 | Knupp |
| 5,966,700 A | 10/1999 | Gould et al. |
| 5,970,479 A | 10/1999 | Shepherd |
| 5,986,673 A | 11/1999 | Martz |
| 5,995,943 A | 11/1999 | Bull et al. |
| 6,006,206 A | 12/1999 | Smith et al. |
| 6,012,046 A | 1/2000 | Lupien et al. |
| 6,018,714 A | 1/2000 | Risen, Jr. |
| 6,018,721 A | 1/2000 | Aziz et al. |
| 6,023,280 A | 2/2000 | Becker et al. |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,061,662 A | 5/2000 | Makivic |
| 6,064,984 A | 5/2000 | Ferguson et al. |
| 6,073,104 A | 6/2000 | Field |
| 6,073,109 A | 6/2000 | Flores et al. |
| 6,073,115 A | 6/2000 | Marshall |
| 6,078,903 A | 6/2000 | Kealhofer |
| 6,078,914 A | 6/2000 | Redfern |
| 6,078,956 A | 6/2000 | Bryant et al. |
| 6,081,774 A | 6/2000 | de Hita et al. |
| 6,088,685 A | 7/2000 | Kiron et al. |
| 6,092,056 A | 7/2000 | Tull, Jr. et al. |
| 6,105,005 A | 8/2000 | Fuhrer |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,103 B1 | 2/2001 | Stewart |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,243,670 B1 | 6/2001 | Bessho et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,110 B1 | 9/2002 | Lection et al. |
| 6,457,066 B1 | 9/2002 | Mein et al. |
| 6,480,882 B1 | 11/2002 | McAdam et al. |
| 6,489,954 B1 | 12/2002 | Powlette |
| 6,490,584 B2 | 12/2002 | Barrett et al. |
| 6,493,681 B1 | 12/2002 | Tertitski et al. |
| 6,510,406 B1 | 1/2003 | Marchisio |
| 6,516,303 B1 | 2/2003 | Wallman |
| 6,516,308 B1 | 2/2003 | Cohen |
| 6,523,022 B1 | 2/2003 | Hobbs |
| 6,556,987 B1 | 4/2003 | Brown et al. |
| 6,564,250 B1 | 5/2003 | Nguyen |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 | 7/2003 | Wallman |
| 6,611,825 B1 | 8/2003 | Billheimer et al. |
| 6,615,187 B1 | 9/2003 | Ashenmil et al. |
| 6,629,097 B1 | 9/2003 | Keith |
| 6,631,373 B1 | 10/2003 | Otani et al. |
| 6,633,868 B1 | 10/2003 | Min et al. |
| 6,711,554 B1 | 3/2004 | Salzmann et al. |
| 6,983,257 B2 | 1/2006 | Gatto |
| 7,191,392 B1 | 3/2007 | Coar |
| 7,222,094 B2 | 5/2007 | Ross |
| 7,392,210 B1 | 6/2008 | MacKay et al. |
| 7,392,212 B2 | 6/2008 | Hancock et al. |
| 2001/0011241 A1 | 8/2001 | Nemzow |
| 2001/0011242 A1 | 8/2001 | Allex et al. |
| 2001/0018674 A1 | 8/2001 | Schein et al. |
| 2001/0025264 A1 | 9/2001 | Deaddio et al. |
| 2001/0032217 A1 | 10/2001 | Huang |
| 2001/0042034 A1 | 11/2001 | Elliott |
| 2001/0043235 A1 | 11/2001 | Best et al. |

| | | | | | | |
|---|---|---|---|---|---|---|
| 2001/0044771 | A1 | 11/2001 | Usher et al. | 2003/0154071 A1 | 8/2003 | Shreve |
| 2001/0056398 | A1 | 12/2001 | Scheirer | 2003/0158949 A1 | 8/2003 | Miller et al. |
| 2002/0002530 | A1 | 1/2002 | May | 2003/0163401 A1 | 8/2003 | Dines et al. |
| 2002/0004777 | A1 | 1/2002 | Foster et al. | 2003/0188255 A1 | 10/2003 | Shimizu et al. |
| 2002/0007335 | A1 | 1/2002 | Millard et al. | 2003/0220861 A1 | 11/2003 | Broms et al. |
| 2002/0007358 | A1 | 1/2002 | Johnson et al. | 2003/0220868 A1 | 11/2003 | May |
| 2002/0013753 | A1 | 1/2002 | Marks de Chabris et al. | 2003/0233459 A1 | 12/2003 | Miller et al. |
| 2002/0013862 | A1 | 1/2002 | Orchard et al. | 2003/0236862 A1 | 12/2003 | Miller et al. |
| 2002/0016762 | A1 | 2/2002 | Feilbogen et al. | 2003/0236957 A1 | 12/2003 | Miller et al. |
| 2002/0016819 | A1 | 2/2002 | Sugimoto et al. | 2004/0039666 A1 | 2/2004 | Fudali et al. |
| 2002/0018077 | A1 | 2/2002 | Powlette | 2004/0064397 A1 | 4/2004 | Lynn et al. |
| 2002/0022956 | A1 | 2/2002 | Ukranincsky et al. | 2004/0078248 A1 | 4/2004 | Altschuler |
| 2002/0023053 | A1 | 2/2002 | Szoc et al. | 2004/0103003 A1 | 5/2004 | Mayers et al. |
| 2002/0026405 | A1 | 2/2002 | Haar | 2004/0148247 A1 | 7/2004 | Miller et al. |
| 2002/0026449 | A1 | 2/2002 | Azencott | 2004/0162775 A1 | 8/2004 | Winklevoss et al. |
| 2002/0026462 | A1 | 2/2002 | Shotton, Jr. et al. | 2004/0167850 A1 | 8/2004 | Dreyer et al. |
| 2002/0029183 | A1 | 3/2002 | Vlahoplus et al. | 2004/0215553 A1 | 10/2004 | Gang et al. |
| 2002/0032644 | A1 | 3/2002 | Corby et al. | 2004/0220885 A1 | 11/2004 | Salzmann et al. |
| 2002/0035561 | A1 | 3/2002 | Archer et al. | 2004/0225596 A1 | 11/2004 | Kemper et al. |
| 2002/0042767 | A1 | 4/2002 | Kwan | 2004/0243502 A1 | 12/2004 | Slowik et al. |
| 2002/0049666 | A1 | 4/2002 | Reuter et al. | 2005/0060256 A1 | 3/2005 | Peterson et al. |
| 2002/0054115 | A1 | 5/2002 | Mack et al. | 2005/0086170 A1 | 4/2005 | Rao |
| 2002/0059141 | A1 | 5/2002 | Davies et al. | 2005/0102214 A1 * | 5/2005 | Speth et al. .................. 705/36 |
| 2002/0065752 | A1 | 5/2002 | Lewis | 2005/0131796 A1 | 6/2005 | Bridges et al. |
| 2002/0065755 | A1 | 5/2002 | Shlafman et al. | 2005/0160024 A1 | 7/2005 | Soderborg et al. |
| 2002/0069157 | A1 | 6/2002 | Jordan | 2007/0043654 A1 | 2/2007 | Libman |
| 2002/0073007 | A1 | 6/2002 | Ayache | | | |
| 2002/0078253 | A1 | 6/2002 | Szondy et al. | | | |

FOREIGN PATENT DOCUMENTS

| | | | |
|---|---|---|---|
| WO | WO 01/20530 | 3/2001 | |
| WO | WO 01/37540 | 5/2001 | |
| WO | WO 01/57716 | 8/2001 | |
| WO | WO 01/59670 | 8/2001 | |
| WO | WO/01/77961 | 10/2001 | |
| WO | WO 02/03774 | 1/2002 | |
| WO | WO 02/14991 | 2/2002 | |
| WO | WO 02/054189 | 7/2002 | |
| WO | WO 02/056146 | 7/2002 | |
| WO | WO 02/063516 | 8/2002 | |
| WO | WO 02/065278 | 8/2002 | |
| WO | WO 02/065286 | 8/2002 | |
| WO | WO/2002/077767 | 10/2002 | |
| WO | WO 03/012588 | 2/2003 | |
| WO | WO 03/030013 | 4/2003 | |
| WO | WO 03/032158 | 4/2003 | |
| WO | WO 03/065256 | 8/2003 | |
| WO | WO 03/102733 | 12/2003 | |
| WO | WO/2004/109451 | 12/2004 | |

Continuing US applications list:

| | | | |
|---|---|---|---|
| 2002/0087373 A1 | 7/2002 | Dickstein et al. | |
| 2002/0087454 A1 | 7/2002 | Calo et al. | |
| 2002/0087455 A1 | 7/2002 | Tsagarakis et al. | |
| 2002/0087457 A1 | 7/2002 | Madeley et al. | |
| 2002/0099646 A1 | 7/2002 | Agarwal et al. | |
| 2002/0099656 A1 | 7/2002 | Poh Wong | |
| 2002/0112056 A1 | 8/2002 | Baldwin et al. | |
| 2002/0123947 A1 | 9/2002 | Yuste et al. | |
| 2002/0130868 A1 | 9/2002 | Smith | |
| 2002/0138390 A1 | 9/2002 | May | |
| 2002/0147671 A1 | 10/2002 | Sloan et al. | |
| 2002/0152154 A1 | 10/2002 | Rothman et al. | |
| 2002/0152156 A1 | 10/2002 | Tyson-Quah | |
| 2002/0156658 A1 | 10/2002 | Selesny et al. | |
| 2002/0161692 A1 | 10/2002 | Loh et al. | |
| 2002/0161853 A1 | 10/2002 | Burak et al. | |
| 2002/0169707 A1 | 11/2002 | Koek et al. | |
| 2002/0174043 A1 | 11/2002 | Gilbert et al. | |
| 2002/0178096 A1 | 11/2002 | Marshall | |
| 2002/0184132 A1 | 12/2002 | Foster | |
| 2002/0184237 A1 | 12/2002 | McFeely | |
| 2002/0194097 A1 | 12/2002 | Reitz | |
| 2002/0194114 A1 | 12/2002 | Erdmier | |
| 2003/0004942 A1 | 1/2003 | Bird | |
| 2003/0009411 A1 | 1/2003 | Ram et al. | |
| 2003/0018558 A1 | 1/2003 | Heffner et al. | |
| 2003/0018714 A1 | 1/2003 | Mikhailov et al. | |
| 2003/0033212 A1 | 2/2003 | Sandhu et al. | |
| 2003/0037174 A1 | 2/2003 | Lavin et al. | |
| 2003/0065594 A1 | 4/2003 | Murphy | |
| 2003/0066025 A1 | 4/2003 | Garner et al. | |
| 2003/0066032 A1 | 4/2003 | Ramachandran et al. | |
| 2003/0078869 A1 | 4/2003 | Williams | |
| 2003/0088496 A1 | 5/2003 | Piotrowski | |
| 2003/0093360 A1 | 5/2003 | May | |
| 2003/0093362 A1 | 5/2003 | Tupper et al. | |
| 2003/0093565 A1 | 5/2003 | Berger et al. | |
| 2003/0105981 A1 | 6/2003 | Miller et al. | |
| 2003/0115122 A1 | 6/2003 | Slater et al. | |
| 2003/0126063 A1 | 7/2003 | Reuter | |
| 2003/0126068 A1 | 7/2003 | Hauk et al. | |
| 2003/0126069 A1 | 7/2003 | Cha | |
| 2003/0126117 A1 | 7/2003 | Megiddo et al. | |
| 2003/0140035 A1 | 7/2003 | Burrows | |
| 2003/0149653 A1 | 8/2003 | Penney | |

OTHER PUBLICATIONS

Silverman, A new strategy for giving away your money, Wall Street Journal, D1, Oct. 6, 2004.

Czejdo, Automatic generation ontology based anntations in XML and their use in retrieval systems, Web Information Systems Engineering, 2000, Proceedings of the First International Conference, Jun. 19, 2000, p. 296.

Novell, Inc., Beginning of Viewing Information and Viewing Basic Information about a print job.

Block Trades Market Practice, Apr. 1, 2003, pp. 1-10.

Chacko, Cephalon, Inc. Taking Risk Management Gherory Seriously.

KUS, Contingent capital: just in the capital management sets a new standard; Sponsored statement.

Electronic Trading Tools.

Martin, Email Report, Issue 11, Aug. 16, 2001, printed Aug. 2, 2005.

Fast Email Extractor 4.4.

Form 10-K, United States Securities and Exchange Commission, no date,year ending Dec. 31, 2003.

Pila, In Case Of Emergency; contingent capital.

Intellseek and Inxight Partner to Provide New Business Intelligence Solutions, www.inxight.com/news/021029_intelliseek.html, Oct. 29, 2002.

Unknown, Investigating Systems.

May, Modeling and Querying Structure and Contents of the Web, 10th International Workshop on Database & Amp; Expert Systems Applications, Sep. 1, 1999, p. 721.

Rupali et al., Phrase-based Text Representation for Managing the Web Documents.

Lam et al., Querying Web Data—The WebQA Approach.

Rising to the challenge of global STP, Euromoney Publications PLC Global Inventor, Nov. 1, 1999, pp. 51-52; Issn. 0951-3604.

STP in the Bond Market?, Wall Street & Technology, Dec. 1, 2002, p. 20.

Ericson, Softwerc releases patent-pending.

IBM Corp., Strict Read Order Control for a Queing System.

Carchiolo et al., Structuring the Web.

Witten et al., Text Mining: A New Frontier for Lossless Compression.

Fan et al., The Internet and Future Financial Markets; Industry Trend or Event, Association for Computing Machinery, Inc., Sec. 11, vol. 43; Nov. 1, 2000, p. 82; Issn: 0001-0782.

Emery, et al., The Measurement of Liquidity, Journal of Accounting Research, vol. 20, No. 2, Part 1, p. 290-303, Autumn 1982.

Calado, The Web-DL Environment for Building Digital Libraries from the Web.

Ribiero-Neto et al., Top Down Extraction of Semi-Structured Data, String Processing and Information Retrieval Symposium & amp.

Roberts, Top Priority on Bottom Line: More Companies Seeting to Manage Business Risks.

TradeWeb's STP vision, Euromoney Institutional Investor PLC, Sec. 406, vol. 34, Feb. 1, 2003, p. S6; Issn: 0014-2433.

Elkayam, Using Indexed Bonds.

Myllymaki With Standard XML Technologies.

Hewlett-Packard, x4queview.org.

Freddie Mac's document custody procedure overview - 2003.

Belton, T., JP Morgan: US Fixed Income Strategy, US Fixed Income Markets 2005 Outlook: Interest Rate Derivatives, pp. 1-14, Nov. 2004.

Richardson, K., "Savvy Investors Can Win for Losing", Wall Street Journal: Moving the Market, p. C3, Feb. 17, 2006.

\* cited by examiner

VOLATILITY DERIVATIVE FINANCIAL PRODUCT

FIELD OF THE INVENTION

The present invention generally relates to a volatility index for a set of one or more assets. More particularly, the invention relates to a financial instrument that allows a user to take a view on and invest in the volatility of a set of underlying assets.

BACKGROUND OF THE INVENTION

Certain techniques for tracking and trading in volatility are known. For example, in equities, trading in volatility has been done through covered call strategies where investors write call options on stocks they own. In fixed income markets, it is known to sell volatility by investing in the U.S. mortgage market. Because U.S. residential mortgages give the borrower the right to prepay the loan without penalty, investors in mortgage backed securities have return profiles similar to portfolios that are long high quality bonds and short interest rate call options.

However, these and other prior art strategies for trading volatility are hampered by the lack of any clear benchmark for evaluating performance. Indeed, when analyzing the performance of volatility strategies, most analysts tend to track changes in implied volatility, delivered volatility, or the difference between implied and delivered volatility as indicators of the success or failure of option-based strategies. However, these measures fail to capture the extreme nonlinearity of option returns and can therefore provide a misleading picture of the risk-return tradeoff in option-based strategies.

An example of a prior art technique is the Chicago Board Options Exchange's Volatility Index, known as VIX. VIX has several shortcomings. For example, it is computed using implied volatilities of certain S&P 500 options only, it is inaccurate in the short term, and it must be actively managed using subjective judgments; that is, its managers are required to take bearish or bullish views on the portfolio. Another problem with VIX is that an investor cannot use it to determine how much money he or she made in investing in volatility. For example, an investor investing in volatility in January when VIX is at 110 does not know whether he or she made money in February when VIX is at 120, let alone how much money. Furthermore, VIX is based on implied volatility, and therefore does not reflect actual profits or losses that arise from actual volatility trading strategies. That is, VIX is not directly related to the profit or loss of trading strategies that involve real options. Because VIX is based only on implied volatility, it fails to take into account gains or losses from the gamma ($\gamma$) effect of delivered volatility (the volatility of the underlying asset itself), and the theta ($\theta$) effect of the passage of time.

U.S. Published Application No. 2005/0102214 to Speth et al. ("Speth"), Ser. No. 10/959,528 is directed to a volatility index and associated derivative contract. However, Speth computes its index as a weighted average of out-of-the-money options. Further, Speth does not employ any options pricing model. The Speth index only uses implied volatility and fails to take into account other parameters, such as gamma ($\gamma$), theta ($\theta$), and particulars of a $\Delta$-hedging strategy. Moreover, Speth does not provide actual profit or loss numbers that arise from trading volatility and cannot be used to benchmark real volatility trading strategies that involve trading actual options.

Successful active subjective management would be one way to improve risk adjusted returns on volatility, if it were possible. However, future realized volatility is not driven by a small set of stable factors in the long term, and hence not predictable in the long term. Thus, active management is generally not a viable means of improving risk adjusted returns.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION OF THE PREFERRED EMBODIMENTS

Certain embodiments of the present invention overcome the disadvantages of prior art techniques. In general, profits or losses that arise from trading volatility depend on parameters gamma ($\gamma$), theta ($\theta$), vega (V or $\kappa$), and the $\Delta$-hedging strategy. Implied volatility, typically denoted as $\sigma$, is a related parameter. However, knowing implied volatility is not sufficient to clculate actual profits and losses. Certain embodiments of the present invention are capable of calculating precise profits or losses that arise in particular volatility trading strategies. That is, certain embodiments of the present invention are capable of calculating actual profits and losses. Such embodiments may provide profits and losses for strategies without relying solely on implied volatility. Such embodiments overcome the prior art problem of directly measuring profit or loss that arises from a particular volatility trading strategy. Furthermore, certain embodiments of the present invention are more accurate than the prior art in the short term.

Figure 1:
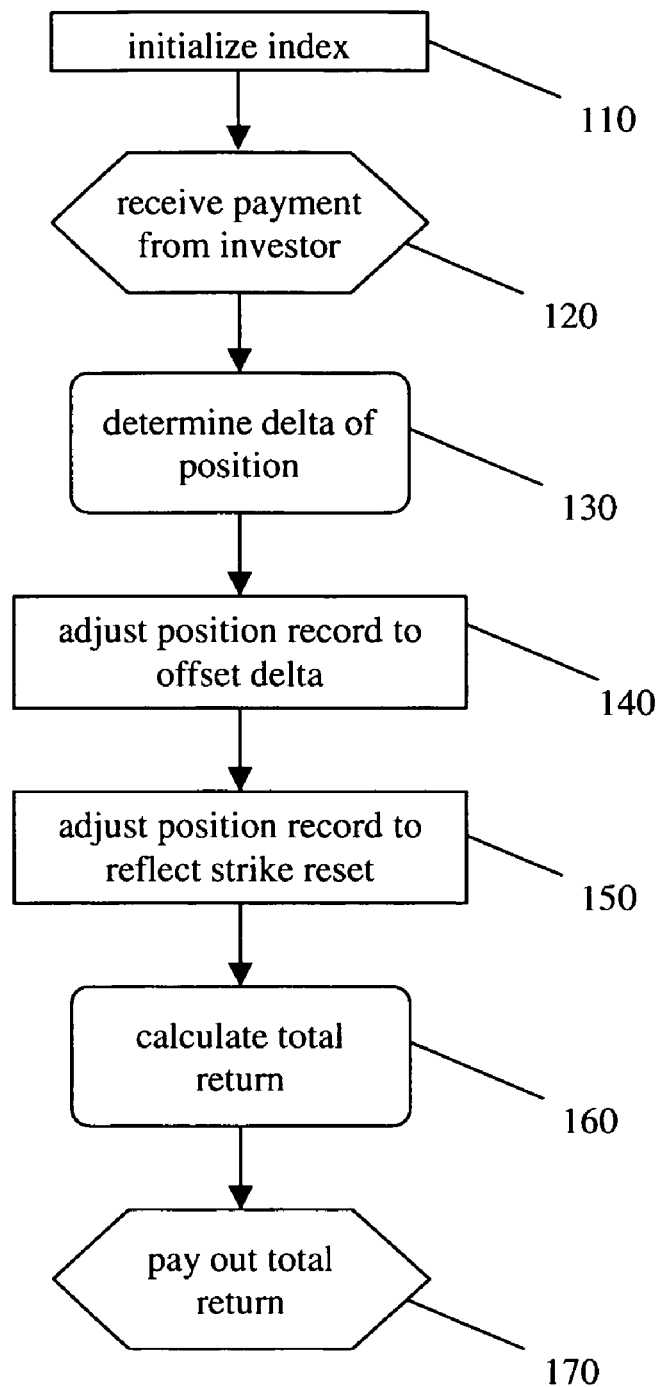
FIG. 1 is a schematic diagram of an embodiment of the present invention.

FIG. 1 is a schematic diagram of an embodiment of the present invention. In this embodiment, a bank keeps a record that represents an index of the volatility of certain assets. Although the term "bank" is used herein, it is contemplated that other entities may implement an embodiment of the present invention. That is, the term "bank" is used herein in a non-limiting capacity. As will be seen, an investor may invest in the index, thereby essentially investing in the volatility of the set of underlying assets. Again, the term "investor" is used in a non-limiting capacity; other entities may be party to certain embodiments of the present invention.

At step 110, the bank initializes the index. In general, the date of the index's initialization, or "index inception date," is chosen arbitrarily. Different index inception dates may be used for different underlying assets where data availability necessitates. As part of initializing the index, the bank initializes a record, which will reflect the state of the index throughout its existence. The index can be used as a benchmark for asset managers and other participants in the options market.

At step 110, the bank also selects a set comprising at least one of a variety of assets. By way of non-limiting examples, the set may consist of any individual or collection of stocks, an index such as the S&P 500, or include one or more interest rate swaps, Eurodollars, bond futures, commodity futures (e.g., crude oil futures). It is for this set of assets that the index tracks volatility.

To finish the step 110 of initializing the index, the bank determines a position that reflects the sale of a call option and a put option on the underlying assets, both struck at the same price at which the underlying assets are trading. A combination of put option and strike option with identical strike price may be referred to as a "straddle." An option with a strike price identical to the price of the underlying asset may be referred to as "at-the-money." Thus, the bank determines a position that reflects the sale of an at-the-money straddle for the underlying assets. The trade may be considered to have executed at, by way of non-limiting example, the market closing price on that day. The bank updates the record to reflect the resulting position.

Note that embodiments of the present invention is not limited to straddles. In particular, the invention may use strangles instead of, or in addition to, straddles. As used herein, the term "strangle" refers to a combination of a put option and a call option with different strike prices. Embodiments of the present invention may implement straddles, strangles, or any combination thereof. Thus, the term "straddle" as used herein is meant to be non-limiting.

It is important to note that embodiments of the present invention do not require the bank to actually hold the position for which it keeps a record. Thus, for example, the act of calculating a position does not necessarily involve actually engaging in that position in the marketplace. Thus, embodiments of the present invention may be used to form a synthetic index. Further, embodiments of the present invention may be used to generate synthetic financial instruments based on the index.

At step 120, an investor conveys payment to the bank in order to invest in the volatility of the underlying assets. This step may occur at any time subsequent to the index inception date (step 110). The bank records receipt of payment and subsequently uses the record to determine the payout to the investor (step 160).

At step 130, the bank determines the delta of the position of record. Delta may be defined as the change in the price of a derivative per unit change in the underlying asset. (Forward yields may be considered the underling asset in the case of swaps or Eurodollar futures.) The delta of a position containing multiple derivatives and other assets may be calculated as the sum of the deltas for each derivative and asset. Delta for assets is typically determined to be one ("1"). The bank performs step 130 periodically, such as, by way of non-limiting example, daily. Discussed immediately below are several techniques for determining delta.

For certain non-exchange traded option instruments, such as swaptions, market makers may directly specify the volatilities. That is, market makers may, by fiat, specify the volatility for a given option. By way of non-limiting example, swaption volatilities may be directly marked by traders. Regardless as to how volatility is determined, it may be used to calculate delta.

In general, for a given option pricing model, there is a one-to-one correspondence between option price and volatility of the underlying asset. Thus, once an option pricing model is selected, the delta may be calculated from empirically-measured option prices by deriving implied volatility. That is, the call and put prices for exchange traded options may be obtained directly from the respective exchange's closing marks, and those prices may be used to derive delta. For example, futures implied volatilities may be obtained from option prices through reverse engineering using a given option pricing model.

An option pricing model is generally used to derive volatility from option prices. By way of non-limiting example, the original or variations of the Black Scholes option pricing model may be used. Again by way of non-limiting example, a formula for pricing a swaption with T years to expiry and an underlying forward swap with M years to maturity is discussed presently. By way of non-limiting example, the price of the swaption in basis points of notional, i.e., the "premium" may be calculated according to:

$$\text{premium} = LA[S_0 N(d_1) - KN(d_2)].$$

In the above formula, the terms A, $d_1$, $d_2$, and $N(x)$ may be calculated according to, by way of non-limiting example:

$$A = \frac{1}{2} \sum_{i=0}^{2M} P(0, t_i),$$

$$d_1 = \frac{\ln\left(\frac{S_0}{K}\right) + \sigma^2 T/2}{\sigma \sqrt{T}},$$

$$d_2 = d_1 - \sigma\sqrt{T}, \text{ and}$$

$$N(x) = \int_{-\infty}^{x} \frac{e^{-\frac{z^2}{2}}}{\sqrt{2\pi}} dz.$$

The term L represents the notional principal on the swaption, $S_0$ represents the underlying forward swap rate, and K represents the strike yield on the swaption. The term $\sigma$ represents the implied volatility, defined as the expected annualized standard deviation of yield returns. This latter term may be linearly interpolated across expirations and maturities, as closing implied volatilities may only be available for standard points. The term $P(0, t_i)$ represents the spot price of a zero coupon bond paying \$1 paying at time $t_i$ and may be computed from closing swap yields.

A closed form solution for receiver swaptions from the Black Scholes model for pricing options may be represented according to, by way of non-limiting example:

$$\text{premium} = LA[KN(-d_2) - S_0 N(-d_1)]$$

The terms appearing in this formula are defined as above.

Once the option pricing model is selected, the delta for the portfolio may be calculated according to, by way of non-limiting example, the following formulas. For swap options, the deltas for the payers and receivers may be calculated according to, by way of non-limiting example, $\Delta_{payer} = L*A*N(d_1)$ and $\Delta_{receiver} = -L*A*N(-d_1)$. Here, the deltas are intended to be measured in basis points of notional.

For options on futures, excluding Eurodollars, the deltas may be calculated according to, by way of non-limiting example:

$$\Delta_{call} = \frac{1}{(1 + r_{repo})^T} N(d_1^f)$$

and $$\Delta_{put} = \frac{-1}{(1 + r_{repo})^T} N(-d_1^f).$$

In these formulas, the terms $d_i^f$ for $i=1$ or 2 may be calculated according to, by way of non-limiting example:

$$d_1^f = \frac{\ln\left(\frac{F}{K_f}\right) + \sigma_f^2 T/2}{\sigma_f \sqrt{T}}$$

and $d_2^f = d_1^f - \sigma_f \sqrt{T}$.

The term $r_{repo}$ represents the funding rate on the daily settlement of futures until option expiry, F represents the closing price on the futures contract, $K_f$ represents the strike on the option, $\sigma_f$ represents the futures implied volatility, defined as the expected annualized standard deviation of price returns, in percentage, and T represents the time to expiry on the option, in years.

For Eurodollar options, the Black Scholes model may be applied on the Eurodollar yield (defined as 100 minus Eurodollar futures price). Thus, a call option in yield space is equivalent to a put option in price space and vice versa.

At step 140, the record of the position is updated to reflect offsetting the delta. In other words, the record of the position is updated in order to rebalance the net delta to zero. This involves calculating the delta of the straddle and establishing an offsetting position in, e.g., the underlying instruments. Thus, the position may include quantities of the underlying instrument. This step is carried out periodically, by way of non-limiting example, each business day. Again, note that the bank need not actually hold the position for which the record is kept; that is, embodiments of the present invention may be sued to form synthetic indices or instruments.

At step 150, the bank periodically updates the record on what are referred to as "strike reset dates." On each strike reset date, the position record is updated to reflect unwinding (e.g., buying back) the put and call options and replacing them with similar put and call options whose strike price is the same as the price of the underlying asset at the time. That is, on each strike reset date, the bank updates the record to reflect unwinding any existing straddles and selling similar at-the-money straddles. Although the straddle is repriced periodically (e.g., daily), it does not change until the strike reset date, when it is unwound. As such, the straddle ages between strike reset dates.

As a concrete example, example, an embodiment of the present invention may be based on a six-month straddle on the underlying asset of crude oil futures. At the beginning of each month, on the strike reset date, the record is updated to reflect buying back the straddle at market price and replacing it by selling a straddle whose strike price is identical to the price of crude oil futures on that strike reset date. Thus, the expiration of the straddle is rolled back by one month, with an at-the-money strike price, on each strike reset date.

Strike reset dates generally occur once a month, but may vary depending on the particular derivative or underlying asset. By way of non-limiting example, the reset dates for an index with interest rate swaptions, commodity futures, or stock index futures comprising the underlying assets may be once per month, typically at the beginning of the month, whereas the reset dates for an index with underlying Eurodollars or bond futures may be one week prior to the expiration of the options.

Reset dates may be implemented partially ad hoc when needed. For example, in the event of a catastrophe, such as a natural disaster, the price of the underlying assets may move a considerable distance from the strike price so as to dilute the volatility character of the portfolio. In such instances, the strike may be reset without waiting for the next scheduled strike reset date.

At step 160, the bank calculates a total return. Each day, the profit or loss ("P/L") from the previous day's closing position is calculated and recorded. This represents the daily total return. For any subsequent date, the index level is the sum of the daily total returns for the period between the inception date and the current date. Thus, the difference in index levels between any two dates represents the total return from selling option volatility for the period between those two dates.

More specifically, the change in the volatility index level on any given day is the gain or loss on the portfolio containing the delta-hedged short straddle as calculated at close of any day. The daily profit or loss on day d, denoted $(P/L)_d$, may accordingly be determined as, by way of non-limiting example:

$$(P/L)_d = -(C_d - C_{d-1}) - (P_d - P_{d-1}) + \Delta_{d-1} * (F_d - F_{d-1}).$$

In the above formula, $\Delta_{d-1}$ represents the number of underlying assets (e.g., futures contracts or forward starting swaps) required to hedge a short straddle position the previous business day, $C_i$ represents the price of a call option for the underlying assets, $P_i$ represents the price of a put option for the underlying assets, and $F_i$ represents the price of the underlying assets. By way of non-limiting example, each day, the bank calculates and records $(P/L)_d$.

The quantities of the above formula may be determined using various techniques and at various intervals. More particularly, the quantities $C_i$ and $F_i$ may be determined empirically. Should the client dispute the values of $C_i$ and $F_i$, certain embodiments of the present invention may allow the investor to, by way of non-limiting example, poll a number of dealers for their prices and take averages of their replies. The quantity $F_i$ may be determined, by way of non-limiting example, by examining actual market prices during the day or at close. Alternately, $F_i$ may be computed using data supplied from the International Swap and Derivative Dealers Association ("ISDA"). The bank may calculate and record $(P/L)_d$ daily or more or less frequently, such as weekly or continuously (i.e., in real-time). For continuous calculation, the quantities $C_i$, $P_i$ and $F_i$ may be calculated continuously and $\Delta_{d-1}$ may be calculated daily.

Further, each day, the bank records the volatility index level. The volatility index level may be represented recursively as, by way of non-limiting example:

$$I_d = I_{d-1} + (P/L)_d.$$

In the above formula, the term $I_d$ represents the index level on day d, and $I_{d-1}$ represents the index level on the previous business day, where $I_0 = 0$ by fiat.

Thus, at step 160, the bank determines the total return on the investor's payment as, by way of non-limiting example:

$$\text{total\_return}_{d0 \to d1} = 0.0001 \times p(I_{d1} - I_{d0}).$$

In the above formula, the term $\text{total\_return}_{d0 \to d1}$ represents the total return on the investor's payment p as invested on day d0 and cashed out on day d1. The quantity 0.0001 is present in order to convert to basis points.

At step 170, the bank pays the investor the total return as calculated at step 160 to the investor. Payment may occur electronically, by mail, or via any other suitable conduit for conveying money. Alternately, or an addition, the bank may retain possession of the payout and reinvest it in volatility or other investments at the instructions of the investor.

Thus, the embodiment of FIG. 1 includes the ability to sell a swap agreement on a volatility index for a set of underlying assets, where an investor could receive (or pay) the difference in the volatility index between two pre-determined dates. Such a swap could have significant value for an investor interested in pursuing a volatility trading strategy because the swap would allow for returns without the inconvenience of having to manage a dynamic trading strategy. In addition, such a swap allows an investor to benefit from a bank's potentially better liquidity in carrying out such a strategy.

Other types of financial products are contemplated in embodiments of the present invention. Such products include, by way of non-limiting example, forwards, options, swaps and swaptions.

A particular type of forward that may be included as part of certain embodiments of the present invention may be constructed as follows. A bank and an investor and agree on a forward index level and a maturity date, such that if the index value is less than the forward index level on the maturity date then no payout occurs. If the actual index value is greater than the forward index level at the maturity date, then the payout is linear in the value of the index (e.g., the payout may be a notional investment multiplied by the quantity of the value of the index minus the offer, possibly multiplied by a scalar such as 0.0001 in order to convert to basis points).

Another example of a financial product that may be implemented in an embodiment of the present invention is a synthetic note or coupon. An investor may purchase a note, and the associated coupon may be determined according to an embodiment of the present invention plus, e.g., a 2% annual return.

Another example financial product that may be implemented in an embodiment of the present invention is a synthetic mortgage-backed security. In particular, synthetic mortgage backed securities with zero convexity may be constructed. This is a desirable feature given that traditional mortgage backed securities may have undesirable negative convexity. In addition, synthetic mortgage backed securities may be used to hedge traditional mortgage backed securities.

Figure 2:
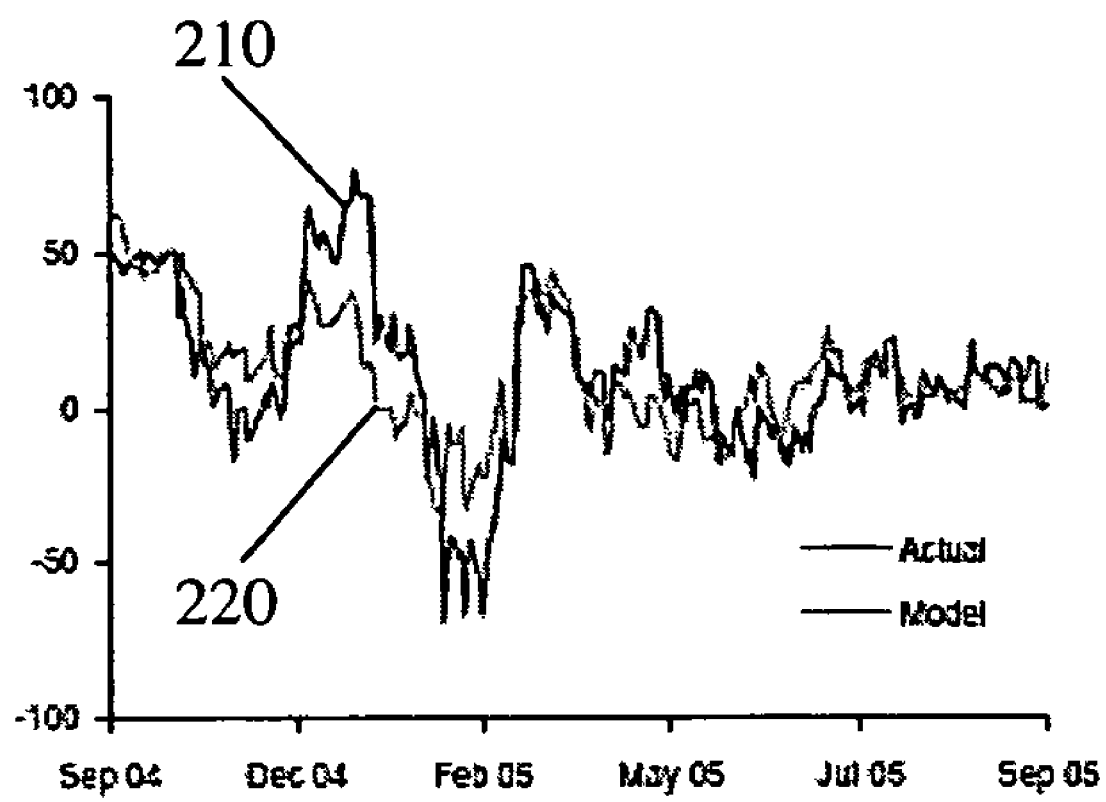
FIG. 2 is a graph used to back-check an embodiment of the present invention using historical data.

FIG. 2 depicts a comparison of an index according to an embodiment of the present invention with data generated from historical information. That is, FIG. 2 thus illustrates back-checking an embodiment of the present invention using historical data. The x-axis of FIG. 2 depicts time, whereas the y-axis of FIG. 2 depicts basis points of notional. Thus, FIG. 2 depicts a curve 210 generated by an embodiment of the present invention and a curve 220 generated according to historical data for the period of Apr. 1, 2005 through Sep. 30, 2005. Note that the techniques described below in reference to FIG. 2 may be implemented to benchmark any volatility trading strategy against a strategy as reflected by an embodiment of the present invention. In particular, curve 220 may be replaced by a curve generated according to a strategy to be benchmarked.

Curve 220 as it appears in FIG. 2 is calculated according to (85.54×Implied volatility)−(2.98×trailing 1-month historical volatility of the 1st constant maturity Eurodollar)−26.64× 6M×10Y forward yield minus 1st constant maturity Eurodollar yield)−452.18. The coefficients in this formula are estimated from ex ante derived betas and alpha. Using those coefficients, the current levels of implied volatility, yield spread and historical Eurodollar volatility, curve 220 depicts an estimate of the projected profit or loss from selling volatility. The Z scores of these projections are then calculated, using the average and standard deviation of forecasted profit or loss in the six months prior to Apr. 1, 2005 (6.84 and 11 respectively). A sell (respectively, buy) signal is generated if the Z score is greater than (respectively, smaller than the negative of) the threshold level.

Table 1 depicts the performance of such a trading model for various Z-score trigger levels. As can be seen, stricter triggers lead to better information ratios, with a 1.5 Z score trigger resulting in 29 (possibly overlapping) trades that led to an information ratio of 0.92.

TABLE 1

Out-of-sample performance of trading signals generated by the model; 04/05-10/05;

| Z-score trigger | # trades | Avg P/L | Std dev | Inf. Ratio |
| --- | --- | --- | --- | --- |
| 0.50 | 79 | 1.61 | 6.74 | 0.24 |
| 1.00 | 54 | 3.12 | 6.80 | 0.46 |
| 1.50 | 29 | 5.32 | 5.78 | 0.92 |

Portions of embodiments of the present invention may be computer implemented. By way of non-limiting example, any of the formulas, variables, constants, data or any other parameters depicted herein may be calculated, measured, stored, conveyed, or retrieved using a computer. By way of non-limiting example, an index according to certain embodiments of the present invention may be conveyed to interested parties by computer link or other communication channel. Such data may be presented as part of a broker's screen. Again by way of non-limiting example, the prices of puts, calls, and/or underlying assets may be retrieved by computer. Embodiments of the present invention may use computer-implemented contracts to bind parties to an agreement in accordance with embodiments of the present invention. Embodiments of the present invention may use computers to transfer funds, such as investment and/or payoff funds.

In general, computers used in embodiments of the present invention may perform calculations or handle data at regular or irregular intervals. By way of non-limiting example, empirically measured data may be retrieved, measured or calculated daily, weekly, or continuously. More generally, any parameter used in any embodiment of the present invention may be retrieved, measured or calculated at various times. The quantity A may be calculated daily or more or less frequently. Other quantities, such as the price of put options, call options, or underlying assets may be calculated daily, continuously, or at other intervals. Computer-implemented calculations or data handling according to certain embodiments of the present invention may be performed continuously or in batches.

Computer-implemented portions of embodiments of the present invention may exist on a single or multiple computers, on computer intranets, or on external networks such as the internet.

Note that embodiments of the present invention have many advantages over the prior art. For example, certain embodiments of the present invention require no subjective human interaction. This is in contrast with VIX, for example, in which the manager takes bearish or bullish positions on the derivatives and underlying assets.

Further, embodiments of the present invention may be used to benchmark volatility trading strategies. That is, a particular trading strategy may be compared to an index according to an embodiment of the present invention. Indexes according to embodiments of the present invention are advantageous over the prior art. For example, neither VIX not Speth provides estimates of actual profits or losses that arise from volatility trading strategies. Embodiments of the present invention may directly provide profit and loss data such that any volatility trading strategy may be compared thereto in order to judge the trading strategy's effectiveness.

The terminology used herein is for the purpose of describing particular embodiments only, and is not intended to limit the scope of the present invention. Unless defined otherwise, all technical, financial and scientific terms used herein have the same meanings as commonly understood by one of ordinary skill in the art to which this invention belongs. As used throughout this disclosure, the singular forms "a," "an," and "the" include plural reference unless the context clearly dictates otherwise.

We claim:

1. A computer implemented method of calculating a position reflecting an investment in volatility of at least one underlying asset, the method comprising:
    selecting at least one underlying asset;
    receiving, from an investor and over a computer network, a payment and an initial investment date;
    adjusting, by a programmed computer, an electronically stored record of the position periodically to represent a sale of at least one put option for the at least one underlying asset and a sale of at least one call option for the at least one underlying asset;
    determining, periodically and by a programmed computer, a delta associated with the position;
    adjusting, periodically and by a programmed computer, the electronically stored record of the position to represent offsetting the delta;
    adjusting, by a programmed computer, the electronically stored record of the position periodically to represent repurchasing and reselling the at least one put option for the at least one underlying asset and repurchasing and reselling the at least one call option for the at least one underlying asset;
    calculating, by a programmed computer, a return on the payment, the return comprising a function of the position on the initial investment date, the position on the end date, and the payment; and
    settling a balance based on the return.

2. The method of claim 1 wherein the at least one substantially at-the-money put option and the at least one substantially at-the-money call option comprise a straddle.

3. The method of claim 1 wherein the at least one substantially at-the-money put option and the at least one substantially at-the-money call option comprise a strangle.

4. The method of claim 1 wherein the step of adjusting a record of the position periodically to represent a sale of at least one put option for the at least one underlying asset and a sale of at least one call option for the at least one underlying asset occurs monthly.

5. The method of claim 1 wherein the step of adjusting the record of the position periodically to represent repurchasing and reselling the at least one put option for the at least one underlying asset and repurchasing and reselling the at least one call option for the at least one underlying asset occurs monthly.

6. The method of claim 1 wherein the step of determining, periodically, a delta associated with the position occurs daily.

7. The method of claim 1 wherein the step of adjusting, periodically, the record of the position to represent offsetting the delta occurs daily.

8. The method of claim 1 wherein the steps of receiving and settling comprise entering into a contract selected from the set consisting of: forward, option, swap, swaption, synthetic note, and synthetic mortgage backed security.

9. The method of claim 1 further comprising, in response to an external event, adjusting the record of the position to represent repurchasing and reselling the at least one put option for the at least one underlying asset and repurchasing and reselling the at least one call option for the at least one underlying asset.

10. A computer implemented method of calculating a position reflecting an investment in volatility of at least one underlying asset, the method comprising:
    selecting at least one underlying asset;
    supplying, by an investor, a payment and an initial investment date to an entity, wherein a programmed computer controlled by the entity adjusts a record of the position periodically to represent a sale of at least one put option for the at least one underlying asset and a sale of at least one call option for the at least one underlying asset, wherein a programmed computer controlled by the entity determines, periodically, a delta associated with the position and adjusts, periodically, the record of the position to represent offsetting the delta, wherein a programmed computer controlled by the entity adjusts the record of the position periodically to represent repurchasing and reselling the at least one put option for the at least one underlying asset and repurchasing and reselling the at least one call option for the at least one underlying asset, and wherein a programmed computer controlled by the entity calculates a return on the payment, the return comprising a function of the position on the initial investment date, the position on the end date, and the payment; and
    settling a balance based on the return.

11. The method of claim 10 wherein the at least one substantially at-the-money put option and the at least one substantially at-the-money call option comprise a straddle.

12. The method of claim 10 wherein the at least one substantially at-the-money put option and the at least one substantially at-the-money call option comprise a strangle.

13. The method of claim 10 wherein the entity adjusts a record of the position periodically to represent a sale of at least one put option for the at least one underlying asset and a sale of at least one call option for the at least one underlying asset monthly.

14. The method of claim 10 wherein the entity adjusts the record of the position periodically to represent repurchasing and reselling the at least one put option for the at least one underlying asset and repurchasing and reselling the at least one call option for the at least one underlying asset monthly.

15. The method of claim 10 wherein the entity determines a delta associated with the position daily.

16. The method of claim 10 wherein the entity adjusts the record of the position to represent offsetting the delta daily.

17. The method of claim 10 wherein the steps of receiving and settling comprise entering into a contract selected from the set consisting of: forward, option, swap, swaption, synthetic note, and synthetic mortgage backed security.

18. The method of claim 10 further comprising, in response to an external event, adjusting the record of the position to represent repurchasing and reselling the at least one put option for the at least one underlying asset and repurchasing and reselling the at least one call option for the at least one underlying asset.

19. A computer implemented method of calculating a position reflecting an investment in volatility of at least one underlying asset, the method comprising:
    selecting at least one underlying asset;
    receiving, from an investor, a payment and an initial investment date;
    adjusting, by a programmed computer, a record of the position periodically to represent a sale of at least one put option for the at least one underlying asset and a sale of at least one call option for the at least one underlying asset;

determining, periodically and by a programmed computer, a delta associated with the position;

adjusting, periodically and by a programmed computer, the record of the position to represent offsetting the delta;

adjusting the record of the position by a programmed computer periodically to represent rolling a strike of the at least one put option for the at least one underlying asset and rolling a strike of the at least one call option for the at least one underlying asset;

calculating a return on the payment, by a programmed computer, the return comprising a function of the position on the initial investment date, the position on the end date, and the payment; and settling a balance based on the return.

20. A computer implemented method of calculating a position reflecting an investment in volatility of at least one underlying asset, the method comprising:

selecting at least one underlying asset;

receiving, from an investor, a payment and an initial investment date;

adjusting, by a programmed computer, a record of the position periodically to represent a sale of at least one substantially at-the-money put option for the at least one underlying asset and a sale of at least one substantially at-the-money call option for the at least one underlying asset;

determining, daily and by a programmed computer, a delta associated with the position;

adjusting, daily and by a programmed computer, the record of the position to represent offsetting the delta;

adjusting, by a programmed computer, the record of the position monthly to represent repurchasing and reselling the at least one substantially at-the-money put option for the at least one underlying asset and repurchasing and reselling the at least one substantially at-the-money call option for the at least one underlying asset;

calculating, by a programmed computer, a return on the payment, the return comprising a product of the payment and a difference between the position on the end date and the position on the initial investment date; and settling a balance based on the return.

* * * * *

UNITED STATES PATENT AND TRADEMARK OFFICE
CERTIFICATE OF CORRECTION

PATENT NO. : 7,620,578 B1 Page 1 of 1
APPLICATION NO. : 11/414426
DATED : November 17, 2009
INVENTOR(S) : Belton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this

Twenty-sixth Day of October, 2010

David J. Kappos
*Director of the United States Patent and Trademark Office*